United States Patent
Yonemaru et al.

(10) Patent No.: US 12,341,197 B2
(45) Date of Patent: Jun. 24, 2025

(54) ELECTROCHEMICAL DEVICE, ELECTRODE FOR ELECTROCHEMICAL DEVICES, COATING LIQUID FOR ELECTROCHEMICAL DEVICES, AND USE OF SAME

(71) Applicant: ZEON CORPORATION, Tokyo (JP)

(72) Inventors: Hiroyuki Yonemaru, Tokyo (JP); Yoko Hashizume, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 591 days.

(21) Appl. No.: 17/757,829

(22) PCT Filed: Dec. 24, 2020

(86) PCT No.: PCT/JP2020/048594
§ 371 (c)(1),
(2) Date: Jun. 22, 2022

(87) PCT Pub. No.: WO2021/132522
PCT Pub. Date: Jul. 1, 2021

(65) Prior Publication Data
US 2023/0055227 A1 Feb. 23, 2023

(30) Foreign Application Priority Data

Dec. 27, 2019 (JP) .................................. 2019-239432
Feb. 28, 2020 (JP) .................................. 2020-034185
(Continued)

(51) Int. Cl.
*H01M 50/414* (2021.01)
*C08G 73/06* (2006.01)
(Continued)

(52) U.S. Cl.
CPC ............ *H01M 4/622* (2013.01); *C08G 73/06* (2013.01); *C09D 179/04* (2013.01); *H01G 11/64* (2013.01);
(Continued)

(58) Field of Classification Search
CPC .......... H01M 4/622; H01M 4/04; H01M 4/13; H01M 4/661; H01M 4/667; H01M 50/414;
(Continued)

(56) References Cited

U.S. PATENT DOCUMENTS

| | | | |
|---|---|---|---|
| 5,856,044 | A | 1/1999 | McLin et al. |
| 2003/0049540 | A1 | 3/2003 | Kohno et al. |

(Continued)

FOREIGN PATENT DOCUMENTS

| | | |
|---|---|---|
| CN | 108475788 A | 8/2018 |
| CN | 109997262 A | 7/2019 |

(Continued)

OTHER PUBLICATIONS

Jun. 28, 2022, International Preliminary Report on Patentability issued in the International Patent Application No. PCT/JP2020/048594.

(Continued)

*Primary Examiner* — Jane J Rhee
(74) *Attorney, Agent, or Firm* — KENJA IP LAW PC

(57) ABSTRACT

An electrochemical device, which is a non-aqueous electrochemical device, comprising a polymer (P) enclosed in an inside of the electrochemical device, wherein the polymer (P) is a polymer having a molecular structure containing a unit (P) represented by the following formula (P), the polymer (P) having a weight-average molecular weight of greater than 50,000, as well as an electrode for an electro- (Continued)

chemical device, a coating liquid for an electrochemical device, an insulating layer for an electrochemical device, an undercoat layer for an electrochemical device, and an electrolytic solution for an electrochemical device including the polymer (P) and other ingredients:

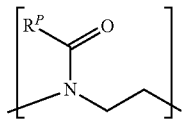

formular (P)

in the formula (P), $R^P$ is a group of 1 to 20 carbon atoms.

32 Claims, 1 Drawing Sheet

(30) Foreign Application Priority Data

Mar. 31, 2020 (JP) .................. 2020-064500
Oct. 7, 2020 (JP) .................. 2020-169595

(51) Int. Cl.
| | | |
|---|---|---|
| *C09D 179/04* | (2006.01) | |
| *H01G 11/64* | (2013.01) | |
| *H01G 11/70* | (2013.01) | |
| *H01M 4/04* | (2006.01) | |
| *H01M 4/13* | (2010.01) | |
| *H01M 4/62* | (2006.01) | |
| *H01M 4/66* | (2006.01) | |
| *H01M 6/16* | (2006.01) | |
| *H01M 10/0525* | (2010.01) | |
| *H01M 10/0567* | (2010.01) | |
| *H01M 50/449* | (2021.01) | |

(52) U.S. Cl.
CPC .............. *H01G 11/70* (2013.01); *H01M 4/04* (2013.01); *H01M 4/13* (2013.01); *H01M 4/661* (2013.01); *H01M 4/667* (2013.01); *H01M 6/168* (2013.01); *H01M 10/0525* (2013.01); *H01M 10/0567* (2013.01); *H01M 50/414* (2021.01); *H01M 50/449* (2021.01); *H01M 2300/0025* (2013.01)

(58) Field of Classification Search
CPC ......... H01M 10/0525; H01M 10/0567; H01M 2300/0025
See application file for complete search history.

(56) References Cited

U.S. PATENT DOCUMENTS

| | | |
|---|---|---|
| 2004/0041537 A1 | 3/2004 | Ishida et al. |
| 2006/0196042 A1 | 9/2006 | Ishida et al. |
| 2007/0218352 A1 | 9/2007 | Kohno et al. |
| 2016/0218394 A1 | 7/2016 | Yamada et al. |
| 2018/0342754 A1 | 11/2018 | Sakamoto et al. |
| 2019/0058195 A1 | 2/2019 | Hanasaki et al. |
| 2019/0379049 A1 | 12/2019 | Ishihara |

FOREIGN PATENT DOCUMENTS

| | | |
|---|---|---|
| JP | S6191861 A | 5/1986 |
| JP | H10334886 A | 12/1998 |
| JP | 2002260739 A | 9/2002 |
| JP | 2002359000 A | 12/2002 |
| JP | 2003272634 A | 9/2003 |
| JP | 2011040318 A | 2/2011 |
| JP | 2012204303 A | 10/2012 |
| JP | 2015133312 A | 7/2015 |
| JP | 2016167408 A | 9/2016 |
| JP | 2018185933 A | 11/2018 |
| JP | 2018206757 A | 12/2018 |
| JP | 2019114390 A | 7/2019 |

OTHER PUBLICATIONS

Yuki Yamada et al., Possibility for secondary battery innovation based on specificity of high concentration electrolyte, Electrochemistry, Dec. 5, 2014, pp. 1085-1090, vol. 82, Issue 12, with a partial English translation.
Apr. 14, 2025, the Extended European Search Report issued by the European Patent Office in the corresponding European Patent Application No. 21761718.2.

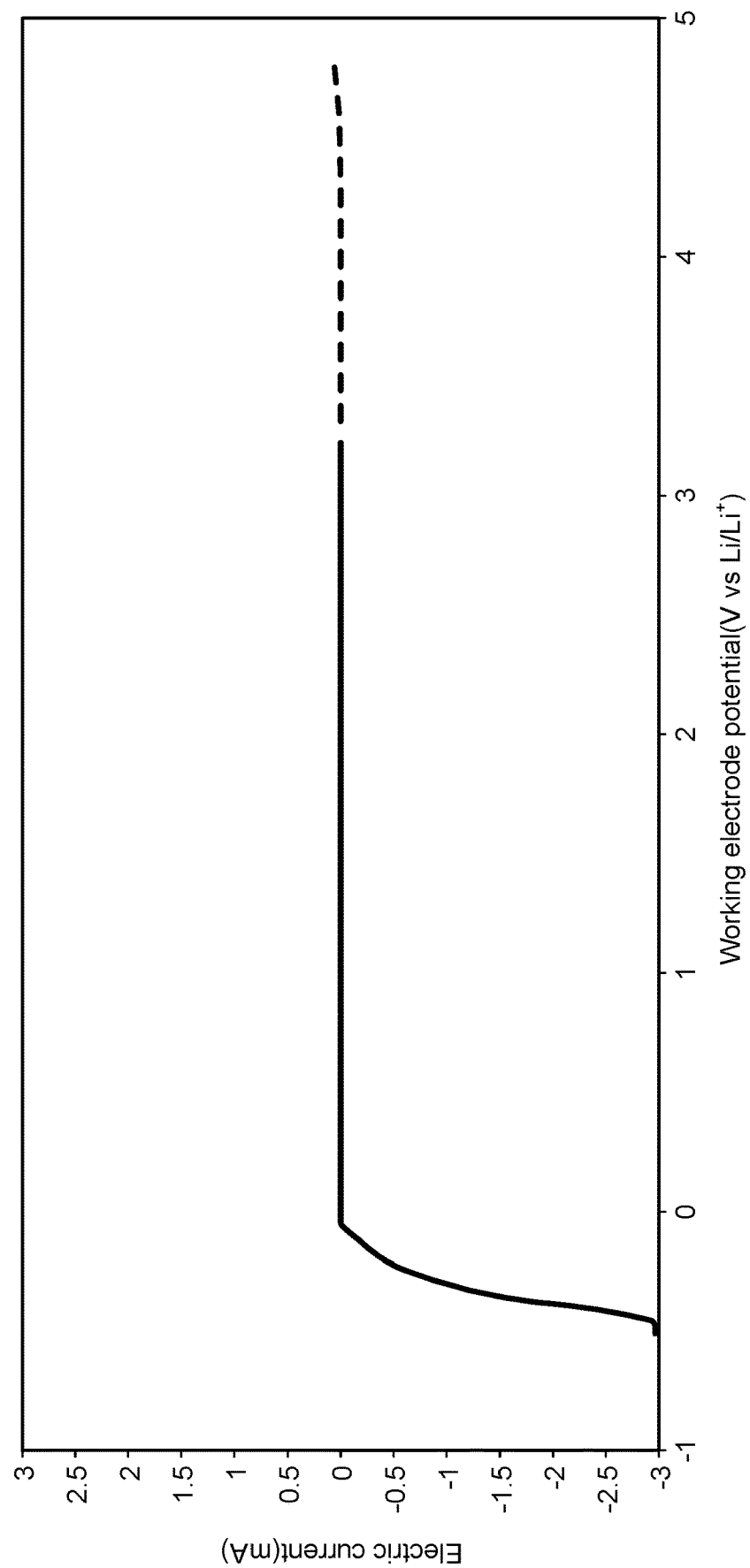

ELECTROCHEMICAL DEVICE, ELECTRODE FOR ELECTROCHEMICAL DEVICES, COATING LIQUID FOR ELECTROCHEMICAL DEVICES, AND USE OF SAME

FIELD

The present invention relates to a non-aqueous electrochemical device such as a lithium ion primary battery and a lithium ion secondary battery. Further, the present invention relates to an electrode for the electrochemical device, a coating liquid for forming a member for the electrochemical device, and use thereof.

BACKGROUND

In general, a non-aqueous electrochemical device such as a primary battery or a secondary battery includes an outer package and a content that is enclosed in the outer package for manifesting the function of the device, such as an electrode and an electrolytic solution. An electrode includes an active material layer and if necessary, a current collector. The active material layer may be a foil body composed of a metal active material or may be a mixture layer containing a granular active material. Due to the contained granular active material, the mixture layer is usually configured as a porous material. The mixture layer is subjected to its use in the device in a state of being impregnated with an electrolytic solution.

In most cases, the mixture layer contains a binder in addition to the active material. Since the mixture layer contains the binder, the granular active material is retained in the mixture layer. As the binder, various substances have been proposed (for example, Patent Literatures 1 and 2).

CITATION LIST

Patent Literature

Patent Literature 1: Japanese Patent Application Laid-Open No. 2003-272634 A
Patent Literature 2: Japanese Patent Application Laid-Open No. 2011-40318 A

SUMMARY

Technical Problem

While the binder is needed to effectively retain the active material in the mixture layer, the binder also has a nature of undesirably impairing the performance of the device. When the mixture layer is impregnated with the electrolytic solution and the electrolytic solution comes into contact with the granular active material, the device exhibits the performance. However, as the binder is attached to the surface of the active material, the exposed surface area of the active material is decreased to thereby prevent the electrolytic solution from coming into contact with the active material. Consequently, the charging-discharging rate may decrease, and the performance of the device, such as rate characteristics, may deteriorate.

As another problem, the performance of the device may be impaired due to low durability of the binder itself. For example, when the binder deteriorates as a result of charging and discharging of the device, the performance of the device, such as a resistance retention ratio and a discharge capacity retention ratio, may deteriorate.

Accordingly, it is an object of the present invention to provide an electrochemical device having a high charging-discharging rate, high durability and excellent performance such as rate characteristics, a resistance retention ratio, and a discharge capacity retention ratio, and an electrode and a coating liquid for constituting the electrochemical device, as well as use thereof.

Solution to Problem

In order to solve the aforementioned problems, the present inventor has performed intensive investigation. As a result, the inventor has found that employment of a polymer having a specific structure and a specific molecular weight as a material forming a binder solves the aforementioned problems. Thus, the present invention has been completed.

That is, the present invention is as follows.

<1> An electrochemical device, which is a non-aqueous electrochemical device, comprising a polymer (P) enclosed in an inside of the electrochemical device, wherein
the polymer (P) is a polymer having a molecular structure containing a unit (P) represented by the following formula (P), the polymer (P) having a weight-average molecular weight of greater than 50,000:

(Chemical formula 1)

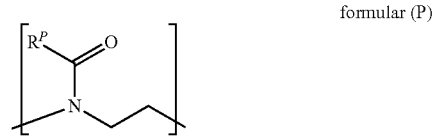

formular (P)

in the formula (P), $R^P$ is a group of 1 to 20 carbon atoms.
<2> The electrochemical device according to <1>, wherein a ratio of the unit (P) relative to the polymer (P) molecule is 50% by weight or more.
<3> The electrochemical device according to <1> or <2>, wherein the polymer (P) contains, as the unit (P), a unit in which the $R^P$ is a methyl group or an ethyl group.
<4> The electrochemical device according to any one of <1> to <3>, wherein the polymer (P) contains, as the unit (P), a unit in which the $R^P$ is a group of 3 to 20 carbon atoms.
<5> The electrochemical device according to any one of <1> to <4>, wherein the polymer (P) contains, as the unit (P), a unit in which the $R^P$ is a group containing a cross-linked structure.
<6> The electrochemical device according to any one of <1> to <5>, wherein the polymer (P) contains, as the unit (P), a unit in which the $R^P$ is a fluorine-containing group.
<7> The electrochemical device according to any one of <1> to <6>, further comprising an electrolytic solution, wherein
an amount of the polymer (P) relative to 100 parts by weight of the electrolytic solution is 5 parts by weight or more.
<8> An electrode for an electrochemical device, which is a non-aqueous electrochemical device, the electrode comprising a granular active material and a polymer (P), wherein
the polymer (P) is a polymer having a molecular structure containing a unit (P) represented by the following formula (P), the polymer (P) having a weight-average molecular weight of greater than 50,000:

(Chemical formula 2)

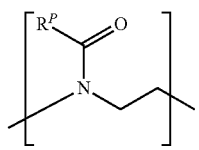

formular (P)

in the formula (P), $R^P$ is a group of 1 to 20 carbon atoms.

<9> The electrode for an electrochemical device according to <8>, wherein a ratio of the unit (P) relative to the polymer (P) molecule is 50% by weight or more.

<10> The electrode for an electrochemical device according to <8> or <9>, wherein the polymer (P) contains, as the unit (P), a unit in which the $R^P$ is a methyl group or an ethyl group.

<11> The electrode for an electrochemical device according to any one of <8> to <10>, wherein the polymer (P) contains, as the unit (P), a unit in which the $R^P$ is a group of 3 to 20 carbon atoms.

<12> The electrode for an electrochemical device according to any one of <8> to <11>, wherein an amount of the polymer (P) relative to 100 parts by weight of the granular active material is more than 1 part by weight.

<13> The electrode for an electrochemical device according to any one of <8> to <12>, comprising a mixture layer containing the granular active material and the polymer (P) and a current collector layer.

<14> The electrode for an electrochemical device according to <13>, wherein the current collector layer is a metal layer.

<15> The electrode for an electrochemical device according to <13> or <14>, wherein the current collector layer has unevenness, with Ry being 500 nm or more, on a surface thereof that is in contact with the mixture layer.

<16> A coating liquid for an electrochemical device comprising a polymer (P), wherein
the polymer (P) is a polymer having a molecular structure containing a unit (P) represented by the following formula (P), the polymer (P) having a weight-average molecular weight of greater than 50,000:

(Chemical formula 3)

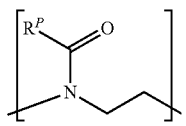

formular (P)

in the formula (P), $R^P$ is a group of 1 to 20 carbon atoms.

<17> The coating liquid for an electrochemical device according to <16>, wherein a ratio of the unit (P) relative to the polymer (P) molecule is 50% by weight or more.

<18> The coating liquid for an electrochemical device according to <16> or <17>, wherein the polymer (P) contains, as the unit (P), a unit in which the $R^P$ is a methyl group or an ethyl group.

<19> The coating liquid for an electrochemical device according to any one of <16> to <18>, wherein the polymer (P) contains, as the unit (P), a unit in which the $R^P$ is a group of 3 to 20 carbon atoms.

<20> The coating liquid for an electrochemical device according to any one of <16> to <19>, wherein the polymer (P) contains, as the unit (P), a unit in which the $R^P$ is a group containing a cross-linkable partial structure.

<21> The coating liquid for an electrochemical device according to any one of <16> to <20>, having a slurry property.

<22> An insulating layer for an electrochemical device, comprising a layer obtained by curing the coating liquid according to any one of <16> to <21>.

<23> The insulating layer according to <22>, comprising a cross-linked product of the polymer (P) formed by curing.

<24> An electrode for an electrochemical device, comprising a layer obtained by curing the coating liquid according to any one of <16> to <21>.

<25> The electrode according to <24>, comprising a cross-linked product of the polymer (P) formed by curing.

<26> An undercoat layer for an electrochemical device, comprising a layer obtained by curing the coating liquid according to any one of <16> to <21>.

<27> The undercoat layer according to <26>, comprising a cross-linked product of the polymer (P) formed by curing.

<28> An electrolytic solution for an electrochemical device, comprising a polymer (P), wherein
the polymer (P) is a polymer having a molecular structure containing a unit (P) represented by the following formula (P), the polymer (P) having a weight-average molecular weight of greater than 50,000:

(Chemical formula 4)

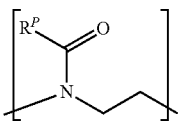

formular (P)

in the formula (P), $R^P$ is a group of 1 to 20 carbon atoms.

<29> The electrolytic solution for an electrochemical device according to <28>, wherein a ratio of the unit (P) relative to the polymer (P) molecule is 50% by weight or more.

<30> The electrolytic solution for an electrochemical device according to <28> or <29>, wherein the polymer (P) contains, as the unit (P), a unit in which the $R^P$ is a methyl group or an ethyl group.

<31> The electrolytic solution for an electrochemical device according to any one of <28> to <30>, wherein the polymer (P) contains, as the unit (P), a unit in which the $R^P$ is a group of 3 to 20 carbon atoms.

<32> The electrolytic solution for an electrochemical device according to any one of <28> to <31>, wherein the polymer (P) contains, as the unit (P), a unit in which the $R^P$ is a group containing a cross-linkable partial structure.

Advantageous Effects of Invention

The present invention provides an electrochemical device having a high charging-discharging rate, high durability and excellent performance such as rate characteristics, a resistance retention ratio, and a discharge capacity retention ratio, and an electrode and a coating liquid for constituting the electrochemical device, as well as use thereof.

BRIEF DESCRIPTION OF DRAWINGS

FIG. 1 is a graph showing experimental results of Reference Example 1 of the present application.

DESCRIPTION OF EMBODIMENTS

Hereinafter, the present invention will be described in detail with reference to embodiments and examples. However, the present invention is not limited to the embodiments and examples described hereinafter, and may be freely modified for implementation without departing from the scope of claims of the present invention and the scope of their equivalents.

In the following description, the term "solvent" is broadly understood and also encompasses meaning of a dispersion medium. That is, the term "solvent" includes not only a medium in a solution (i.e., a mixture of a substance that is a liquid medium and another substance that is a solute that is present in the liquid medium in a dissolved manner) but also a medium in a dispersion liquid (i.e., a mixture of a substance that is a liquid medium and another substance that is a dispersed substance that is present in the liquid medium in a dispersed manner as solid particles or emulsion particles), and a medium in a mixture containing both a solute and a dispersed substance.

In the following description, "(meth)acrylate" is a term encompassing "acrylate", "methacrylate", and mixtures thereof, unless otherwise specified.

(1. Summary of Electrochemical Device)

The electrochemical device of the present invention is a non-aqueous electrochemical device. That is, the electrochemical device of the present invention includes a content, such as an electrode and an electrolytic solution, that is present in an enclosed manner in a sealed space inside a device container, and such a content includes a solid and a liquid other than water. The liquid enclosed in the device may include a trace amount of water. In this case, the concentration of water is 10,000 ppm or less, preferably 1,000 ppm or less, and more preferably 500 ppm or less.

On the other hand, the container is a constituent element for forming a sealed space in the device, and is not particularly limited as long as it has a physical property that allows formation of such an inside space. The material forming the container is not present in the space inside the container, and thus the material forming the container is not categorized as a material enclosed in the inside of the electrochemical device.

(2. Polymer (P))

The electrochemical device of the present invention includes a polymer (P) enclosed therein. The polymer (P) is a polymer having a molecular structure containing a unit (P) represented by the following formula (P).

(Chemical formula 5)

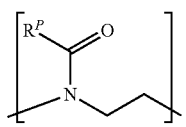

formular (P)

$R^P$ in the formula (P) is a group of 1 to 20 carbon atoms. $R^P$ may be linear or branched, or have a ring structure. $R^P$ may be a hydrocarbon group or a group containing elements other than carbon and hydrogen. $R^P$ may have an ether structure, an amine structure, or both in the middle of the chain. $R^P$ may further contain a hetero element such as a halogen atom including a fluorine atom.

$R^P$ may include a cross-linked structure. Herein, the cross-linked structure refers to a bonding structure of the polymer (P) to another $R^P$, and thus, when $R^P$ has a cross-linked structure, a plurality of RPs has a structure bonded to one another. For example, as the polymer (P) contained in a material for producing an electrochemical device of the present invention, those having a cross-linked structure may be used. Alternatively, an electrochemical device including the polymer (P) having a cross-linked structure can be produced by using those having a cross-linkable partial structure in $R^P$ and performing a cross-linking reaction of the cross-linkable partial structure in a production process of the electrochemical device. Since the polymer (P) has a cross-linked structure as $R^P$, durability of the electrochemical devices can be further improved. Examples of the cross-linkable partial structure may include a carbon-carbon unsaturated bond (double bond or triple bond), an epoxy group, an oxetane group, a carboxyl group, an acetoacetyl group, an isocyanate group, a thiol group, and combinations of these. When having such a structure, a cross-link can be formed by a cross-linking reaction.

$R^P$ may have an aromatic ring. In a case where the polymer (P) is used as a material of the mixture layer and the mixture layer further contains a carbon material such as a carbon active material, it is preferable that $R^P$ has an aromatic ring because the polymer (P) has a higher affinity between the polymer (P) and the carbon material. Examples of the aromatic ring may include, but are not limited to, a phenyl group, a naphthyl group, an anthracenyl group, a pyrenyl group, and a biphenyl group, and may be a ring having even more carbon atoms than these.

In a certain embodiment, $R^P$ preferably has 1 to 2 carbon atoms. When the carbon number of $R^P$ is in the range of 1 to 2, it is possible to obtain a material that has an appropriate affinity to solvents in many cases, and thereby it is possible to obtain an electrochemical device that has a high charging-discharging rate, high durability, and excellent performance such as rate characteristics, a resistance retention ratio, and a discharge capacity retention ratio. In addition to these, it is possible to satisfactorily dissolve the polymer (P) in a coating liquid using water as a solvent.

In another embodiment, the carbon number of $R^P$ is preferably 3 to 20. When the carbon number of $R^P$ is 3 to 20, the lipophilicity of the polymer (P) can be enhanced. When a highly lipophilic polymer (P) is required, the $R^P$ with such a carbon number is preferable.

More specific examples of $R^P$ may include a methyl group, an ethyl group, a propyl group, a butyl group, an alkyl group having higher carbon number than the butyl group, a phenyl group, an oxyethylene chain, and a fluorinated alkyl group of various lengths. These may have a cyclic structure.

By appropriately selecting the type of $R^P$, the degree of properties such as hydrophilicity of the polymer (P) can be adjusted. For example, a polymer (P) having high hydrophilicity can be obtained by increasing the ratio of one or more of a methyl group, an ethyl group, a propyl group, and an oxyethylene chain among all $R^P$'s in the polymer (P). For example, the polymer (P) can be made as a water-soluble substance. By increasing the ratio of one or more of a butyl group or an alkyl group having a higher carbon number than the butyl group, and a phenyl group among all $R^P$'s in the polymer (P), a polymer (P) having high lipophilicity can be obtained. By increasing the ratio of the fluorine-containing group in all $R^P$'s in the polymer (P), a polymer (P) having high water repellency can be obtained.

The polymer (P) may be a homopolymer composed of only one type of unit (P), may be a copolymer composed of a plurality of types of units (P), and may be a copolymer composed of one type or a plurality of types of units (P) and other units. In a case where the polymer (P) is a copolymer, the type of the copolymer may be any of a random copolymer, a block copolymer, a graft copolymer, or the like. In a case where the polymer (P) contains a unit other than the unit (P), examples of such a unit may include a (meth) acrylate unit obtained by polymerization of (meth)acrylate such as methyl (meth)acrylate or ethyl (meth)acrylate.

However, when the polymer is a copolymer, the ratio of the unit (P) relative to the polymer (P) molecule is preferably 50% by weight or more, and more preferably 60% by weight or more. The upper limit of such ratio may be 100% by weight. In addition, the molecular structure of the polymer (P) may preferably include a structure in which 3 or more units (P) are consecutively bonded to one another. When the polymer (P) has such a structure, it is possible to obtain an electrochemical device that has a high charging-discharging rate, high durability, and excellent performance such as rate characteristics, a resistance retention ratio, and a discharge capacity retention ratio.

The weight-average molecular weight of the polymer (P) is greater than 50,000, preferably 100,000 or more, more preferably 150,000 or more, and still more preferably 200,000 or more. The upper limit of the weight-average molecular weight is not particularly limited, and may be 10,000,000 or less. When the weight-average molecular weight is equal to or higher than the above-mentioned lower limit, it is possible to obtain an electrochemical device that increases mechanical strength of device constituent elements containing the polymer (P), has a high charging-discharging rate, high durability, and excellent performance such as rate characteristics, a resistance retention ratio, and a discharge capacity retention ratio. In particular, when the weight-average molecular weight is a large value other than the above-mentioned lower limit, it is possible to exhibit good lubricating performance. When the weight-average molecular weight is equal to or lower than the above-mentioned upper limit, handleability of the polymer (P) can be improved.

The molecular weight distribution of the polymer (P) is preferably 1.0 or more, more preferably 1.1 or more, and is preferably 10 or less, still more preferably 5.0 or less, and still more preferably 3.0 or less. The molecular weight distribution is a value (Mw/Mn) represented by the ratio of the weight-average molecular weight (Mw) relative to the number-average molecular weight (Mn). Molecular weight and molecular weight distribution values may be determined by gel permeation chromatography (GPC) using polyethylene oxide as a standard substance.

Although not being bound to any particular theory, it is believed that a mechanism whereby the electrochemical device of the present invention containing the polymer (P) brings about the effects of the present invention is as follows.

Since the unit (P) constituting the polymer (P) contains an amide structure (—CO—N), the polymer (P) has high thermal resistance and can exhibit strong adhesive force to another member constituting the device, such as a current collector, a separator substrate, and a granular active material. It is believed that thereby the resistance to various stresses in the electrochemical device is enhanced. When the polymer (P) is present as a solid, the polymer (P) functions as an adhesive. When the polymer (P) is present in a state where the polymer (P) is dissolved in a liquid or the polymer (P) is swelled by impregnation with a liquid, the polymer (P) exhibits tackiness and lubricative properties, and the degree of damage on the device due to friction when the electrochemical device receives an intrinsic or extrinsic force can be decreased. The polymer (P) has an extremely wide electropotential window (see Reference Example 1). It is believed that this is also due to a chemically stable amide structure contained in the polymer. When an electron-withdrawing substituent (for example, fluorine) is introduced into the polymer (P), oxidation resistance is further enhanced. When an electron-donating substituent (for example, long-chain alkyl) is introduced into the polymer (P), reduction resistance is further enhanced. Because of its lower chemical reactivity and diffusion speed, the polymer (P) having a high molecular weight shows small reaction amount per unit time, which leads to high electrochemical stability. High molecular weight of the polymer (P) is preferable also because thereby the ratio of a chain terminal having relatively high chemical reactivity is decreased. It is further preferable that the polymer (P) has a ring structure. By using the polymer (P) for the electrochemical device, a device that has low tendency to cause an increase in electrical resistance over a long period can be formed. It is believed that the suppression of the deterioration of the device is achieved by its low tendency to inhibit movement of ions.

The method for producing the polymer (P) is not particularly limited, and the polymer (P) may be produced by a known production method. Examples of the method for producing the polymer (P) may include ring-opening polymerization of a compound having an oxazoline ring, acylation of a polyethylenimine, polymerization of a macromer having an oxazoline chain, and graft polymerization from a polymer having an initiating group on a side chain. When a macromer having an oxazoline chain is copolymerized with another polymer, a block copolymer containing a unit (P) and another polymerization unit can be produced. Examples of the copolymerizable polymer may include silicone, polylactic acid, and polyethylene oxide.

When the polymer (P) having a cross-linked structure is produced, a cross-linking reaction may be performed. Specifically, the polymer (P) having a cross-linked structure may be obtained by using a polymer (P) having a cross-linkable partial structure as $R^P$, or a polymer having another cross-linkable group, as a material, and performing a cross-linking reaction suitable for the cross-linkable structure. Examples of the cross-linking reaction may include photocrosslinking, thermal crosslinking, electron beam crosslinking, radiation crosslinking, and ionic crosslinking.

Examples of the compound having an oxazoline ring may include compounds represented by the following formula (P2).

(Chemical formula 6)

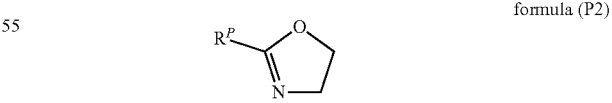

formula (P2)

$R^P$ in the formula (P2) and preferable examples thereof are the same as $R^P$ in the formula (P) and the preferable examples thereof. The terminal group of the polymer (P) is not particularly limited, and may be a terminal group obtained by ring-opening of an ordinary oxazoline derivative, or may be various functional groups or a terminal group which causes additional addition or polymerization depending on selection of a polymerization initiator or a terminator.

Examples thereof may include an alkyl group such as a methyl group, a hydroxyl group, a thiol, a vinyl group, alkynes, azides, piperazines, acrylates, methacrylates, and epoxides.

In the electrochemical device of the present invention, the polymer (P) may be present as a binder for binding the granular active material mainly in the mixture layer (that is, the positive electrode mixture layer and/or the negative electrode mixture layer). The polymer (P) may also be present in a layer other than the mixture layer, for example, the insulating layer as a binder for binding particles such as inorganic particles constituting the insulating layer. The polymer (P) may be present as an undercoat layer as a layer interposed between two layers (for example, between the current collector and the mixture layer). According to what the present inventor has found, since the polymer (P) has the above-mentioned specific structure and molecular weight, good performance as a binder can be exhibited while the electrolytic solution infiltrates well. As a result, an electrochemical device having constituent elements (a mixture layer, an insulating layer, an undercoat layer, and the like) containing the polymer (P) can be configured to have a high charging-discharging rate, high durability, and excellent performance such as rate characteristics, a resistance retention ratio, and a discharge capacity retention ratio.

The polymer (P) may also be present as a component of the electrolytic solution. In the electrochemical device of the present invention, a portion of the polymer (P) which is the component of the electrode mixture layer at the time of producing the electrode mixture layer may be present also in a state where it is eluted into the electrolytic solution. In the electrochemical device of the present invention, the weight of the polymer (P) may be defined relative to the total amount of the electrolytic solution enclosed in the electrochemical device. Specifically, the amount of the polymer (P) relative to 100 parts by weight of the electrolytic solution is preferably 5 parts by weight or more, more preferably 10 parts by weight or more, and still more preferably 15 parts by weight or more. The upper limit of the amount of the polymer (P) relative to 100 parts by weight of the electrolytic solution is not particularly limited, and may be, for example, 50 parts by weight or less. In the device, it is preferable that the amount of the polymer (P) relative to the electrolytic solution is equal to or greater than the lower limit, particularly in a case where the polymer (P) is mainly present as a component of the electrode mixture layer and a part of the polymer (P) is present also in a state of being eluted into the electrolytic solution. In this case, the elution of the polymer (P) from the electrode mixture layer can be suppressed, and the performance of the device can be maintained for a longer period of time.

Examples of the electrode including the mixture layer containing the polymer (P) in the electrochemical device of the present invention may include an electrode for an electrochemical device described below.

In addition to the electrodes, the electrochemical device of the present invention may include constituent elements, which the electrochemical device may normally include, such as an electrolytic solution and an insulating layer.

As an electrolytic solution, an organic electrolytic solution in which a supporting electrolyte is dissolved in an organic solvent is usually used. Examples of the supporting electrolyte, in a case where the electrochemical device is a lithium ion secondary battery, a lithium primary battery, or an electrochromic device, may include a lithium salt. Examples of the lithium salts may include $LiPF_6$, $LiAsF_6$, $LiBF_4$, $LiB(C_2O_4)F_2$, $LiB(C_2O_4)_2$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_3CLi$, $(FSO_2)_2NLi$, $(CF_3SO_2)_2NLi$, and $(C_2F_5SO_2)NLi$. Among these, $LiBF_4$, $LiPF_6$, $(CF_3SO_2)_2NLi$, and $(FSO_2)_2NLi$ are preferable, and $LiPF_6$, $(CF_3SO_2)_2NLi$, and $(FSO_2)_2NLi$ are particularly preferable, because they are easily solved in a solvent and have a higher degree of dissociation. As the supporting electrolyte, one type thereof may be solely used, and two or more types thereof may also be used in combination at any ratio.

Examples of the supporting electrolyte in a case where the electrochemical device is a capacitor may include a lithium salt described above, and other onium salts. Examples of the onium salts may include triethylmethylammonium tetrafluoroborate, tetraethylammonium tetrafluoroborate, N,N-diethyl-N-methyl-N-(2-methoxyethyl) ammonium bis(trifluoromethanesulfonyl)imide, 1-ethyl-3-methylimidazolium tetrafluoroborate, 1-ethyl-3-methylimidazolium bis(trifluoromethanesulfonyl)imide, and N,N-diethyl-N-methyl-N-(2-methoxyethyl)-tetrafluoroborate. However, the examples are not limited to the foregoing, and may further include other nitrogen cation and phosphorous cation. As the supporting electrolyte, one type thereof may be solely used, and two or more types thereof may also be used in combination at any ratio.

In a case where the electrochemical device is any of other devices, a supporting electrolyte including carrier ions of the device may be selected.

As an organic solvent which is a component of the electrolytic solution, a solvent capable of dissolving a supporting electrolyte may be appropriately selected. Examples of the organic solvent may include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; sulfur-containing compounds such as sulfolane and dimethyl sulfoxide; and mixtures thereof. Among these, carbonates are preferable because of their high dielectric constant and wide stable electropotential region. In particular, a mixture of ethylene carbonate and/or propylene carbonate and an organic solvent having a boiling point of 150° C. or lower is preferable from the viewpoint of imparting ionic conductivity to the polymer (P). As the organic solvent, one type thereof may be solely used, and two or more types thereof may also be used in combination at any ratio.

From the viewpoint of suppressing elution of the polymer (P) into the electrolytic solution upon use of the device as described above, an electrolytic solution containing the polymer (P) may be used at the time of producing the device. In that case, the amount of the polymer (P) relative to the electrolyte solution may be set in the same range as described above. Specifically, the amount of the polymer (P) relative to 100 parts by weight of the electrolytic solution may be preferably 5 parts by weight or more, more preferably 10 parts by weight or more, and still more preferably 15 parts by weight or more. The upper limit of the amount of the polymer (P) relative to 100 parts by weight of the electrolytic solution is not particularly limited, and may be, for example, 50 parts by weight or less.

An insulating layer may be disposed between the positive and negative electrodes. By providing the insulating layer, it is possible to avoid conduction due to contact between the positive and negative electrodes. As the insulating layer, known insulating layers used for an electrochemical device may be used. Examples of the insulating layer in a case where the electrochemical device is a lithium ion secondary battery may include a separator described in Japanese Patent Application Laid-Open No. 2012-204303 A. As a material of the insulating layer, a porous film made of a polyolefin-based resin (polyethylene, polypropylene, polybutene, polyvinyl chloride, or the like) is preferable from the viewpoint that such an insulating layer can be made in a shape having a small thickness, and thus the ratio of the electrode active material inside the device can be increased to increase the capacity per volume. Alternatively, an insulating layer in which a porous layer is further provided using the coating liquid for an electrochemical device of the present invention on the surface of the resin porous film is also preferable.

Specific examples of the electrochemical device of the present invention may include various types of non-aqueous primary batteries, secondary batteries, electric double layer capacitors, electric double layer transistors, electrochromic display materials, electrochemical light-emitting elements, electrochemical actuators, and dye-sensitized solar batteries. Examples of the batteries may include a lithium primary battery, a lithium ion secondary battery, a lithium metal secondary battery, a sodium ion battery, a potassium ion battery, a magnesium ion battery, an aluminum ion battery, and an air battery. A lithium ion primary battery or a lithium ion secondary battery is particularly preferable.

The method for producing the electrochemical device of the present invention is not particularly limited. The electrochemical device may be produced in accordance with an already known method for producing a device using the constituent elements described above. For example, a device may be produced by stacking a positive electrode and a negative electrode via an insulating layer, rolling or folding them to make them fit to the shape of the if necessary, placing them into a battery container, filling the battery container with an electrolytic solution, and sealing the battery container. In order to prevent an increase in internal pressure of a secondary battery and occurrence of overcharging and overdischarging and the like, an over-current protection element such as a fuse or a PTC element, an expanded metal, a lead plate, or the like may be provided, if necessary. The shape of the device may be, for example, any of a coin type, a button type, a sheet type, a cylindrical type, a square type, and a flat type.

(3. Coating Liquid for Electrochemical Device)

The coating liquid for an electrochemical device of the present invention is a coating liquid that may be used to form a layer structural body such as an electrode, an insulating layer, and an undercoat layer that are constituent elements for an electrochemical device.

The coating liquid of the present invention contains a polymer (P). The polymer (P) and preferable examples thereof are the same as the polymer (P) and the preferable examples in the electrochemical device of the present invention as described above. When a polymer (P) in which $R^P$ contains a cross-linked structure is formed as the polymer (P) in the electrochemical device, it is particularly preferable that the polymer (P) in which $R^P$ contains a cross-linkable partial structure is used as the polymer (P) contained in the coating liquid from the viewpoint of easy handling during production and easy formation of a cross-linked structure in a product to be obtained.

The coating liquid of the present invention may further contain a solvent. Examples of the solvent may include water, an organic solvent such as N-methylpyrrolidone, and mixtures thereof. In a process of producing a layered structural body using the coating liquid, the solvent is volatilized, and the entirety of the solvent is removed or only a trace amount of the solvent remains.

It is preferable that the viscosity of the coating liquid of the present invention is a specific high value. The viscosity is preferably 5 cP or more, and more preferably 10 cP or more. The upper limit of the viscosity is not particularly limited, and for example, may be 100,000 cP or less. Representing the ratio of the polymer (P) in the coating liquid of the present invention by the ratio of the polymer (P) relative to the solvent on a weight basis, the ratio is preferably 5:95 or more, more preferably 7:93 or more, and further preferably 9:91 or more. The upper limit of the ratio of the polymer (P) is not particularly limited, and for example, may be 50:50 or less. The viscosity is a value measured under viscosity measurement conditions of 25° C. and 6 rpm with a B-type viscosimeter. When the viscosity is equal to or more than the aforementioned lower limit, a coated product having only a few tears or blurs can be obtained.

The coating liquid of the present invention may have slurry properties. Specifically, the slurry properties are properties in which the coating liquid exhibits flowability without exhibiting a fixed form, and in which particles and fibers that are insoluble in a solvent which constitutes the coating liquid are suspended over approximately the entirety of the coating liquid. The preferable viscosity range of the slurry is 10 to 100,000 cP. Due to the slurry properties, formation of a layer structural body such as an electrode can be easily performed, this formation including a process of applying the coating liquid onto a current collector, a process of drying the coating liquid, and the like.

(4. Coating Solution for Electrodes)

Of the coating liquid for the electrochemical device of the present invention, a coating liquid for an electrode (that is, a coating liquid which may be used for forming an electrode) will be described. The coating liquid for an electrode may be a slurry coating liquid containing a granular active material, the polymer (P), and a solvent.

As an active material constituting the granular active material, a material known to be contained as an active material in a mixture layer of electrodes may be appropriately selected. In a case where the coating liquid is for forming a mixture layer of a positive electrode or a negative electrode of a lithium ion secondary battery, examples of the compound constituting an active material for a positive electrode may include a compound containing a lithium atom such as lithium cobaltate (LCO), lithium iron phosphate (LFP), and lithium titanate (LTO). Examples of the compound constituting an active material for a negative electrode may include graphite, amorphous carbon, silicon, silicon oxide, and metallic lithium.

The particle diameter of the granular active material is preferably 0.1 μm or more, and more preferably 0.5 μm or more, and is preferably 50 μm or less, and more preferably 40 μm or less, from the viewpoint that the electrode can favorably exhibit desired performance. The particle diameter may be a number-average particle diameter.

In the coating liquid for an electrode, the ratio of the granular active material and the polymer (P) may be appropriately adjusted to a range in which the electrode can exhibit desired performance. Specifically, the ratio of the polymer (P) relative to 100 parts by weight of the granular active material is preferably more than 1 part by weight, and more preferably 1.5 parts by weight or more, and is preferably 20 parts by weight or less, and more preferably 10 parts by weight or less. Since the coating liquid containing the polymer (P) increases in viscosity depending on its concentration, the concentration of the polymer (P) may be appropriately adjusted also from the viewpoint of setting the concentration of the coating liquid within an appropriate range. As compared with a conventional viscosity modifier such as CMC (carboxymethyl cellulose), an increase in viscosity relative to an increase in concentration of the polymer (P) is moderate, so that an easy adjustment of viscosity is possible in such adjustment using the polymer (P). The polymer (P) has a smaller degree of inhibition of ion transfer in the mixture layer than a conventional viscosity modifier such as CMC.

The coating liquid for an electrode may contain an optional component in addition to the granular active material, the polymer (P), and the solvent. As an optional component, any component known to be contained in a mixture layer as a constituent element of a mixture layer may be appropriately selected.

Examples of the optional component may include various polymers other than the polymer (P) that are conventionally known to be used as a binder. By appropriately adding such a polymer, mechanical strength of the mixture layer can be further improved. Examples of such polymers may include PVDF (polyvinylidene fluoride), PVDF-HFP (vinylidene fluoride-hexafluoropropylene copolymer), PTFE (polytetrafluoroethylene), CMC (carboxymethyl cellulose), alginic acid, polyacrylic acid, PAN (polyacrylonitrile), SBR(-Lx) (styrene-butadiene rubber latex), NBR(-Lx) (nitrile-butadiene rubber latex), BR(-Lx) (butadiene rubber latex), ACR(-Lx) (acrylic rubber latex), polyethylene oxide, and combinations thereof. When the coating liquid for an electrode contains the polymer (P) and other binders, the ratio of the polymer (P) in the total amount thereof is preferably 10% by weight or more, and more preferably 20% by weight or more. When the ratio of the polymer (P) is equal to or more than the lower limit, sufficient ionic conductivity can be imparted to the binder component.

Further examples of optional components may include particulate components that improve the function of the mixture layer such as electroconductive materials. As the electroconductive material, known materials such as acetylene black, graphite, graphene, and carbon nanotubes may be used.

Examples of optional components other than the above may include a thickener, a dispersant, a leveling agent, an antioxidant, a defoaming agent, a wetting agent, a pH adjusting agent, and combinations thereof. From the viewpoint of properly exhibiting the performance of the coating liquid for an electrode by the granular active material and the polymer (P), it is preferable that the ratio of the optional component is small. Specifically, the ratio of the total of the granular active material, the electroconductive material, and the polymer (P) relative to the total solid content (components other than the solvent, that is, components that do not volatilize but remain when a mixture layer is formed) in the coating liquid for an electrode is preferably 90% by weight or more, and more preferably 95% by weight or more. The upper limit of such a ratio may be 100% by weight.

The method for preparing a coating liquid for an electrode is not particularly limited, and for example, preparation may be performed by mixing the respective components described above.

(5. Electrode for Electrochemical Device)

The electrode of the present invention is an electrode that may serve as the constituent element of the aforementioned electrochemical device of the present invention. The electrode of the present invention may contain a porous mixture layer and a current collector. The electrode of the present invention contains the granular active material and the polymer (P). The granular active material and the polymer (P) are usually components of the mixture layer. The mixture layer may further contain an optional component that constitutes the electrode. The granular active material, the polymer (P), the optional component, preferable examples thereof, and the content ratios thereof in the mixture layer are the same as examples thereof in the coating liquid for an electrode as those described above.

The ratios of the granular active material and the polymer (P) in the electrode of the present invention are the same as the ratios thereof in the coating liquid for an electrode described above. That is, the ratio of the polymer (P) relative to 100 parts by weight of the granular active material is preferably more than 1 part by weight, and more preferably 1.5 parts by weight or more, and is preferably 20 parts by weight or less, and more preferably 10 parts by weight or less.

However, in production of the device, the polymer (P) may form a gel in the inside of the mixture layer, or the polymer (P) may be eluted from the mixture layer over the lapse of time after the time point at which the electrode is made in a state of being impregnated with the electrolytic solution. When such an elution occurs, the ratio of the granular active material and the polymer (P) in the mixture layer may be altered with the lapse of time. The amount of the polymer (P) eluted and the speed thereof may vary according to various conditions such as the type of the polymer (P), the amount of the polymer (P) contained in the electrolytic solution, and conditions for preservation and use of the device. The ratio of the polymer (P) at the time of production may be a value higher than the lower limit value described above so that the ratio of the polymer (P) in the mixture layer becomes equal to or more than the lower limit described above during the entire using lifetime of the device. As described above, when the polymer (P) is added to the electrolytic solution at the time of the device production, the elution of the polymer (P) after production can be suppressed.

The polymer (P) in the mixture layer may be uniformly present in the entire mixture layer, or the polymer (P) may be unevenly distributed at a region that is a part of the inside of the mixture layer. For example, there may be a gradient in which the concentration of the polymer (P) in the inside of the mixture layer is low and the concentration of the polymer (P) on the surface (an exposed surface or an interface between the mixture layer and the other layer) of the mixture layer is high. Presence of such a gradient is particularly preferable since thereby the mechanical strength of the surface of the mixture layer can be efficiently enhanced. When a polymer such as PVDF or CMC is used alone, an improvement in strength due to uneven distribution may be expected, although the uneven distribution thereof may adversely affect the properties of the device because of absence of ionic permeability.

The thickness of the mixture layer in the electrode of the present invention may be appropriately adjusted so as to obtain desired performance. Specifically, the thickness of the mixture layer is preferably 5 µm or more, and more preferably 10 µm or more, and is preferably 1000 µm or less, and more preferably 600 µm or less.

The current collector in the electrode of the present invention may be a metal foil. Examples of the metal constituting the foil may include copper, aluminum, lithium, stainless steel, titanium, molybdenum, iron, and nickel. The thickness of the current collector is preferably 5 µm or more, and more preferably 8 µm or more, and is preferably 100 µm or less, and more preferably 50 µm or less.

The electrode of the present invention may include an optional layer in addition to the mixture layer and the current collector. For example, the electrode may include an undercoat layer interposed between the mixture layer and the current collector. The undercoat layer will be described later.

The electrode of the present invention may be produced by curing the coating liquid for an electrode. Specifically, the electrode may be produced by applying the coating liquid for an electrode onto the surface of the current collector to form a coating liquid layer and by curing the coating liquid layer to form the mixture layer. The coating liquid for an electrode may be cured by drying and heating a layer of the coating liquid to volatilize the solvent, and if necessary, subjecting such a layer to pressurization treatment. When a polymer (P) having a cross-linkable group is used as the polymer (P), a reaction for forming a cross-linked structure is performed, if needed. As a result, a mixture layer containing the polymer (P) having a cross-linked structure can be obtained.

If the pressurization treatment is performed in formation of the mixture layer, the condition for the pressurization treatment may be controlled so that the density of the mixture layer to be obtained becomes a desired value. For example, the density of the mixture layer may be 0.5 to 6.0 g/cm³. If the pressurization treatment is performed, the granular shape of the granular active material may be transferred onto the current collector, and thereby unevenness may be formed on the interface thereof (that is, a surface in contact with the mixture layer). The height of the unevenness is preferably 500 nm or more, and more preferably 800 nm or more. The value of height of the unevenness is a maximum height Ry defined by JIS. The upper limit of the height of the unevenness is not particularly limited, and may be 3,000 nm or less. It is further preferable that the 10-point average roughness Rz is 500 nm or more. When such unevenness is formed, particles of the active material and the like are retained, and thus the adhesion of the mixture layer to the current collector may be enhanced. From the viewpoint of enhancing adhesion of the mixture layer to suppress detachment and peeling and the viewpoint of suppressing displacement of the mixture layer and the current collector, it is preferable that the unevenness is formed. The unevenness may be formed during pressing. Employment of a current collecting foil on which unevenness is previously formed may also be preferable. For forming unevenness on the current collector, for example, mechanical processing such as hitting or scratching or chemical treatment such as etching may be used.

(6. Insulating Layer)

The insulating layer of the present invention includes a layer obtained by curing the aforementioned coating liquid for an electrochemical device of the present invention. For example, the insulating layer may be a layer having a multilayer structure including a resin layer formed of a porous resin that is usually used as a separator, and a porous layer that is provided on the surface of the resin layer and contains the polymer (P). In addition to the polymer (P), the porous layer may contain particles such as non-electroconductive inorganic particles that are used as a constituent material for a porous membrane. By having such a configuration, the insulating layer of the present invention can exhibit performance as a favorable insulating layer while the insulating layer is well impregnated with the electrolytic solution. The thickness of the porous layer containing the polymer (P) in the insulating layer is preferably 200 µm or less. The lower limit of the thickness is not particularly limited, and may be 1 µm or more. A coating liquid forming the porous layer may be a liquid containing the polymer (P), particles for forming a porous material, and a solvent. By application of the liquid onto the surface of the resin layer and subsequent curing, the porous layer can be formed and thereby the insulating layer of the present invention can be obtained.

(7. Undercoat Layer)

In general, an undercoat layer may be present as a layer interposed between two layers constituting the electrochemical device (for example, between the current collector and the mixture layer).

The undercoat layer of the present invention includes a layer obtained by curing the coating liquid for an electrochemical device of the present invention. The undercoat layer of the present invention may consist only of the layer obtained by curing the coating liquid for an electrochemical device of the present invention. That is, the undercoat layer may have a structure of a single layer containing the polymer (P). In addition to the polymer (P), the undercoat layer may contain electroconductive small structural bodies such as electroconductive particles or electroconductive fibers. The particle diameter of electroconductive particles or the fiber diameter of electroconductive fibers may be smaller than the particle diameter of the granular active material in the mixture layer. By providing the undercoat layer between the current collector and the mixture layer, mechanical adhesion of the current collector and the mixture layer can be enhanced, and electrical resistance between the current collector and the mixture layer can be decreased. A coating liquid forming the undercoat layer may be a liquid containing the polymer (P), the electroconductive small structural body, and a solvent. By applying the liquid onto the surface of another layer such as the current collector and subsequent curing, the undercoat layer can be formed.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure, unless otherwise specified.

In the following description, as the polymers, the following materials were used. Among these, regarding Polymer 1, Polymer 2, Comparative Polymer C1, Comparative Polymer C2, Comparative Polymer C3, Comparative Polymer C4, and Comparative Polymers C5 to C7, commercially available polymers were used as they were.

Polymer 1: poly-2-ethyl-2-oxazoline (manufactured by Aldrich, 373974, weight-average molecular weight: 500,000, molecular weight distribution: 3 to 4)

Polymer 2: poly-2-ethyl-2-oxazoline (manufactured by Aldrich, 372854, weight-average molecular weight: 200,000, molecular weight distribution: 3 to 4)

Polymer 3: poly-2-ethyl-2-oxazoline (weight-average molecular weight: 60,000)

Polymer 4: an ester polymer of acrylic acid and poly-2-ethyl-2-oxazoline having a hydroxyl group at its terminal (weight-average molecular weight: 200,000)

Polymer 5: an ester polymer of acrylic acid and poly-2-methyl-2-oxazoline having a hydroxyl group at its terminal (weight-average molecular weight: 130,000)

Polymer 6: a poly(ethyleneimine-2-ethyloxazoline) copolymer (weight-average molecular weight: 440,000)

Comparative Polymer C1: carboxymethyl cellulose (manufactured by Daicel Chemical Co., Ltd., Daicel 1110)

Comparative Polymer C2: poly-2-ethyl-2-oxazoline (manufactured by Aldrich, 741906, weight-average molecular weight: 10,000, molecular weight distribution: 1.5 or less)

Comparative Polymer C3: poly-2-methyl-2-oxazoline (manufactured by Aldrich, 795283, number-average molecular weight: 5,000, molecular weight distribution: 1.3 or less)

Comparative Polymer C4: polyethylene oxide (manufactured by Aldrich, 181994, viscosity-average molecular weight: 200,000)

Comparative Polymer C5: polyvinylidene fluoride (Solef (registered trademark) 5130 manufactured by SOLVAY Co., Ltd., weight-average molecular weight: 1,000,000)

Comparative Polymer C6: poly-2-ethyl-2-oxazoline (manufactured by Aldlich, 372846, weight-average molecular weight: 50,000, molecular weight distribution: 3 to 4)

Comparative Polymer C7: poly-2-ethyl-2-oxazoline (manufactured by Aldlich, 741884, weight-average molecular weight: 35,000, number-average molecular weight: 25,000, molecular weight distribution; 1.4)

Production Example 1: Polymer 3

Poly-2-ethyl-2-oxazoline having a weight-average molecular weight of 50,000 and poly-2-ethyl-2-oxazoline having a weight-average molecular weight of 100,000 were mixed in a ratio of 4:1 by weight to obtain a mixture. This mixture was used as Polymer 3 in the following experiments.

Production Example 2: Polymer 4

Poly-2-ethyl-2-oxazoline (Comparative Polymer C7) having a hydroxyl group at its terminal was dissolved in dichloromethane and subjected to a dehydrochlorination reaction with acryloyl chloride in the presence of triethylamine at 25° C. for 48 hours to obtain a macromonomer. This macromonomer was an acrylate having an acryloyl group bonded to the terminal of the 2-ethyl-2-oxazoline chain. This macromonomer was polymerized using azobisisobutyronitrile as an initiator in acetonitrile at 60° C. for 120 hours to obtain Polymer 4. The weight-average molecular weight and the molecular weight distribution of Polymer 4 were measured by GPC, and found to be 200,000 and 2.3, respectively.

Production Example 3: Polymer 5

Poly-2-methyl-2-oxazoline (Comparative Polymer C3) having a hydroxyl group at its terminal was dissolved in dichloromethane and subjected to a dehydrochlorination reaction with acryloyl chloride in the presence of triethylamine at 25° C. for 48 hours to obtain a macromonomer. This macromonomer was an acrylate having an acryloyl group attached to the terminal of the 2-methyl-2-oxazoline chain. This macromonomer was polymerized in water using V-50 (Fujifilm Wako Pure Chemical Industries) as an initiator at 60° C. for 24 hours to obtain Polymer 5. The weight-average molecular weight and the molecular weight distribution of Polymer 5 were measured by GPC, and found to be 130,000 and 2.0, respectively.

Production Example 4: Polymer 6

Partial hydrolysis of Polymer 1 was carried out. Specifically, Polymer 1 was dissolved in 0.1M hydrochloric acid and heated and stirred at 120° C. for 5 hours to obtain Polymer 6 in which 12% of its amide structure was hydrolyzed to be an imine structure. The percentage of hydrolyzed units was calculated from $^1$H-NMR.

Example 1-1

(1-1-1. Positive Electrode)

Into a planetary mixer, 100 parts of LiFePO$_4$ (granular active material; number-average particle diameter: 1 μm) as a positive electrode active material, 5 parts of acetylene black (HS-100 manufactured by Denka Company Limited) as an electroconductive material, and a 9% aqueous solution of Polymer 1 as a binder in an amount equivalent to a solid content of Polymer 1 of 2 parts were placed, and ion-exchanged water was added as a dispersion medium and mixed so that the total solid content concentration became 61%. Thus, a slurry composition for a positive electrode of a lithium ion secondary battery was prepared.

The slurry composition for a positive electrode was applied onto an aluminum foil having a thickness of 20 μm and Rz of 0.36 μm as a positive electrode current collector with a comma coater so that the coating amount became 8 mg/cm$^2$. As a result, a multilayer product having a layer configuration of (positive electrode current collector layer)/(slurry composition layer for positive electrode) was obtained. The multilayer product was conveyed in an oven of 60° C. at a speed of 0.5 m/minute over 2 minutes for drying, and then subjected to a heating treatment at 120° C. for 2 minutes. As a result of such an operation, a primary material for a positive electrode having a layer configuration of (positive electrode current collector layer)/(dried slurry layer for positive electrode) was obtained.

The primary material for a positive electrode was pressurized with a roll press machine. The condition for pressurization was controlled so that the density of a positive electrode mixture layer to be obtained became 2.00 g/cm$^3$. For removal of the dispersion medium, the primary material for a positive electrode after the pressurization treatment was allowed to stand under a vacuum environment at a temperature of 120° C. for 3 hours. As a result of such an operation, a positive electrode having a layer configuration of (positive electrode current collector layer)/(positive electrode mixture layer) was obtained.

(1-1-2. Secondary Battery)

The positive electrode obtained in (1-1-1) was cut into a circular shape having a diameter of 12 mm to obtain a circular positive electrode.

A lithium metal foil (thickness: 200 μm) was cut into a circular shape having a diameter of 14 mm to obtain a circular negative electrode.

A polypropylene separator of a single layer was cut into a circular shape having a diameter of 19 mm to obtain a circular separator.

A stainless steel coin-shaped outer container for constituting a coin cell battery CR2032 and including a polypropylene gasket and a stainless steel cap having a thickness of 0.2 mm to be fit to an opening of the outer container were prepared.

The circular positive electrode, the circular separator, and the circular negative electrode were stacked in this order. The direction of the circular positive electrode was the direction in which the surface on the side of the positive electrode mixture layer was in contact with the circular separator. The stack was put into the outer container. An electrolytic solution (solvent: EC/EMC=3/7 (weight ratio), electrolyte: 1 M LiPF$_6$) was injected into the outer container so as to completely remove air in the container. The cap was fit to the outer container via the gasket and fixed to seal the outer container. Thus, a lithium ion secondary battery having a diameter of 20 mm and a thickness of about 3.2 mm was produced. The amount of the injected electrolytic solution was 160 mg, and the excess electrolytic solution was wiped off.

(1-1-3. Discharge Capacity Retention Ratio)

For the lithium ion secondary battery produced in (1-1-2), the discharge capacity retention ratio under an environment of 25° C. was measured. Charging and discharging at a constant current of 0.1 C were performed between 2.50 to 4.00 V. The discharge capacity C1 during this operation was measured. Subsequently, a combination of charging and discharging operations, in which CC charging at a constant current of 0.1 C was performed, CV charging was performed until the current value was 0.002 C after the voltage reached 4.0 V, and subsequent discharging at a constant current of 0.1 C was performed, was performed 10 times. The tenth discharge capacity C10 was measured. From the values C1 and C10, the discharge capacity retention ratio ΔC=(C10/C1)×100(%) was determined. A large discharge capacity retention ratio ΔC that is close to 100% is indicative of a high ability of maintaining the discharge capacity. The obtained discharge capacity retention ratio ΔC was 99%.

(1-1-4. Resistance Retention Ratio)

For the lithium ion secondary battery produced in (1-1-2), the resistance retention ratio under an environment of 25° C. was calculated. From a voltage V1c during charging at the first cycle in the measurement of the discharge capacity retention ratio of (1-1-3), a voltage V1d during discharging at the first cycle, a voltage V10c during charging at the tenth cycle, and a voltage V10d during discharging at the tenth cycle, the resistance retention ratio ΔR=(V1c-V1d)/(V10c-V10d) was determined. A large resistance retention ratio ΔR that is close to 1 is indicative of a high ability of reducing an increase in resistance. The obtained resistance retention ratio ΔR was 1.0.

(1-1-5. Dynamic Stress Resistance)

The positive electrode obtained in (1-1-1) was cut to obtain a rectangular sample of 1 cm×5 cm. The sample was immersed in an electrolytic solution (1 M LiPF$_6$, solvent: EC/EMC=3/7 (weight ratio)). While the sample was immersed, the sample was bent with the surface on the side of the positive electrode mixture layer facing outward. The bent portion was observed, and the degree of dynamic stress resistance was evaluated. As a result, detachment of the positive electrode mixture layer was not observed.

(1-1-6. Presence or Absence of Unevenness)

The positive electrode obtained in (1-1-1) was cut with a cross section polisher to form a cross-section parallel to the thickness direction. The cross-section was observed with a scanning electron microscope. As a result, particles of the positive electrode active material and the electroconductive material were protruded into the current collector layer, and thereby unevenness was formed. The roughness of the unevenness was measured. The maximum height Ry was 1.1 μm, and the 10-point average roughness Rz was 0.76 μm.

Examples 1-2 to 1-4

A primary material for a positive electrode was obtained by the same manner as that of (1-1-1) of Example 1-1 except that the coating amount of the slurry composition for a positive electrode in (1-1-1) was changed to 10 mg/cm$^2$ (Example 1-2), 12 mg/cm$^2$ (Example 1-3), or 14 mg/cm$^2$ (Example 1-4). The obtained primary material for a positive electrode was evaluated for dynamic stress resistance by the same manner as that of (1-1-5) of Example 1-1. As a result, detachment of the positive electrode mixture layer was not observed.

Comparative Example 1-1

A battery was obtained and evaluated by the same manner as that of Example 1-1 except for the following changes.
   In the production of the positive electrode of (1-1-1), Comparative Polymer C1 was used instead of Polymer 1.
   The amount of ion-exchanged water added was changed, so that the total solid concentration of the slurry composition for a positive electrode of a lithium ion secondary battery was set to 50%.

The obtained discharge capacity retention ratio ΔC was 99%.

The obtained resistance retention ratio ΔR was 2.0. That is, by the charging and discharging for ten cycles, the resistance of the electrode was doubled.

When the dynamic stress resistance was evaluated, it was confirmed that the positive electrode mixture layer was detached from the bent portion, and that there emerged a portion of the exposed aluminum foil of the positive electrode current collector in a line shape at the bent portion.

The roughness of the unevenness was measured. The maximum height Ry was 1.2 μm, and the 10-point average roughness Rz was 0.87 μm.

Comparative Examples 1-2 to 1-4

An attempt was made to obtain a positive electrode by the same manner as that of (1-1-1) of Example 1-1 except for the following changes.
   In the production of the positive electrode of (1-1-1), Comparative Polymer C1 was used instead of Polymer 1.
   The amount of ion-exchanged water added was changed, so that the total solid concentration of the slurry composition for a positive electrode of a lithium ion secondary battery was set to 50%.
   The coating amount of the slurry composition for a positive electrode in (1-1-1) was changed to 10 mg/cm$^2$ (Comparative Example 1-2), 12 mg/cm$^2$ (Comparative Example 1-3), or 14 mg/cm$^2$ (Comparative Example 1-4).

However, in any of Comparative Examples 1-2 to 1-4, a large crack occurred in the direction along the application direction by the comma coater, and the positive electrode mixture layer peeled off from the current collecting foil. Consequently, the attempt for obtaining a positive electrode was unsuccessful. It is considered to be because the CMC was unable to withstand the mechanical stresses associated with dimensional changes caused by heating and drying.

Examples 1-5 to 1-8

Batteries are obtained and evaluated by the same manner as that of Example 1-1 except for the following changes.

In the production of the positive electrode of (1-1-1), a mixture of 1 part of Polymer 1 and 1 part of CMC are used in 1 part each, instead of using 2 parts of Polymer 1.

The amount of ion-exchanged water added was changed, so that the total solid concentration of the slurry composition for a positive electrode of a lithium ion secondary battery was set to 52%.

The coating amount of the slurry composition for a positive electrode in (1-1-1) was changed to 10 mg/cm$^2$ (Example 1-6), 12 mg/cm$^2$ (Example 1-7), or 14 mg/cm$^2$ (Example 1-8). (The amount of 8 mg/cm$^2$ was not changed in Examples 1-5.)

The positive electrode can be produced without cracking (which occurred in Comparative Examples 1-2 to 1-4).

Example 2

A battery is obtained and evaluated by the same manner as that of Example 1-1 except for the following change.

In the production of the positive electrode of (1-1), 4 parts of Polymer 2 is used instead of Polymer 1.

In this example, the discharge capacity retention ratio ΔC was 99%, and the resistance retention ratio ΔR was 1.0. No detachment of the positive electrode mixture layer was observed in dynamic stress resistance, and regarding all the items, the performance were at the same level as those in Example 1.

Example 3

A battery is obtained and evaluated by the same manner as that of Example 1-1 except for the following change.

In the production of the positive electrode of (1-1), 3 parts of Polymer 4 is used instead of Polymer 1.

In the case of the present embodiment, performance equivalent to that of Example 1 can be expected in both of the discharge capacity retention ratio ΔC and the dynamic stress resistance.

Example 4

A battery is obtained and evaluated by the same manner as that of Example 1-1 except for the following change.

In the production of the positive electrode of (1-1), 3 parts of Polymer 5 is used instead of Polymer 1.

In the case of the present embodiment, performance equivalent to that of Example 1 can be expected in both of the discharge capacity retention ratio ΔC and the dynamic stress resistance.

Comparative Example 2

In the production of the positive electrode of (1-1), an attempt was made to produce a battery by the same manner as that of Example 1, except that Comparative Polymer C2 was used instead of Polymer 1. In this case, when the primary material for a positive electrode was pressurized with a roll press, the dried slurry layer for a positive electrode peeled off from the current collector layer, and cracking of the dried slurry layer for positive electrode occurred. Consequently, the attempt for obtaining a positive electrode was unsuccessful.

Example 5-1

Into a planetary mixer, 100 parts of LiCoO$_2$ (manufactured by Nippon Chemical Industries, Co. Ltd., CELLSEED C, a granular active material; number-average particle diameter: 20 μm) as a positive electrode active material, 2.1 parts of acetylene black (HS-100 manufactured by Denka Company Limited) as an electroconductive material, and a 8% NMP solution of Polymer 1 as a binder in an amount equivalent to a solid content of Polymer 1 of 1.6 parts were placed, and NMP was further added as a dispersion medium and mixed so that the total solid content concentration became 81%. Thus, a slurry composition for a positive electrode of a lithium ion secondary battery was prepared.

The slurry composition for a positive electrode was applied onto an aluminum foil having a thickness of 20 μm as a positive electrode current collector with a comma coater so that the coating amount became 20 mg/cm$^2$. As a result, a multilayer product having a layer configuration of (positive electrode current collector layer)/(slurry composition layer for positive electrode) was obtained. As the aluminum foil, a long-length aluminum foil having a width of 12 cm was used, and application was performed by moving the comma coater in a direction parallel to the longitudinal direction in a region having a width of 8 cm at the center in the width direction.

The multilayer product was conveyed in an oven of 60° C. at a speed of 0.5 m/minute over 2 minutes for drying, and then subjected to a heating treatment at 120° C. for 2 minutes. As a result of such an operation, a primary material for a positive electrode having a layer configuration of (positive electrode current collector layer)/(dried slurry layer for positive electrode) was obtained.

The primary material for a positive electrode was pressurized with a roll press. The condition for pressurization was controlled so that the density of a positive electrode mixture layer to be obtained became 3.90 g/cm$^3$. For removal of the dispersion medium, the primary material for a positive electrode after the pressurization treatment was allowed to stand under a vacuum environment at a temperature of 120° C. for 3 hours. As a result of such an operation, a positive electrode having a layer configuration of (positive electrode current collector layer)/(positive electrode mixture layer) was obtained.

The warpage amount of the obtained positive electrode was measured. Measurement of the amount of warpage was performed by placing the positive electrode on a horizontal table with the surface on the positive electrode mixture layer side facing up, and measuring a distance between the surface of the table and the central portion, in the width direction, of the lower surface of the positive electrode mixture layer. The amount of warpage was 0.1 cm.

Comparative Example 3

A positive electrode was obtained and the amount of warpage thereof was measured by the same manner as that of Example 5-1, except that an 8% NMP solution of Comparative Polymer C5 was used instead of the 8% NMP solution of Polymer 1 (the amount added was 1.6 parts as the solid content of Comparative Polymer C5, that is the same amount as that in Example 5-1). The positive electrode thus obtained was arched in the width direction and largely warped. It is considered that this indicates that the residual amount of the stress associated with the processing history was large. A large warpage is not preferable because it makes it difficult to produce an electrochemical device. The amount of warpage was 1.8 cm.

Example 5-2

A positive electrode was obtained and the amount of warpage thereof was measured by the same manner as that of Example 5-1 except for the following change.

As a binder, instead of using the 8% NMP solution of Polymer 1, a combination of an 8% NMP solution of Polymer 1 and an 8% NMP solution of Comparative Polymer C5 was used. These amounts of use were set to 0.8 part as the solid content of Polymer 1 and 0.8 part as the solid content of Comparative Polymer C5, respectively.

The amount of warpage was 0.8 cm.

Reference Example 1: Measurement of Electropotential Window

Linear sweep voltammetry (LSV) was performed to confirm the electrochemical stability of polyoxazoline.

Polymer 1 was dissolved in 1M $LiPF_6$ (solvent; EC/EMC=3/7, weight ratio) at a concentration of 10% to prepare a polymer solution.

A working electrode, a counter electrode, and a reference electrode were immersed in the polymer solution, and a first electropotential sweep was performed. As the working electrode, an aluminum foil, having a surface area of 2 $cm^2$ (with dimensions of 1 cm×1 cm), that was coated with electroconductive carbon was used. As the counter electrode and the reference electrode, a lithium metal foil was used. The sweep was performed at 1 mV/s from a natural electropotential state to 4.8 V relative to $Li/Li^+$.

Subsequently, the working electrode was changed to a copper foil (surface area 2 $cm^2$, with dimensions of 1 cm×1 cm), and a second electropotential sweep was performed at 1 mV/s from a natural electropotential state to −0.5 V relative to $Li/Li^+$.

The results are shown in FIG. 1. In FIG. 1, the broken line indicates the result of the first electropotential sweep, and the solid line indicates the result of the second electropotential sweep.

From the results in FIG. 1, it can be seen that polyoxazoline is electrochemically stable over a wide electropotential range of at least 0 to 4.8 V (vs $Li/Li^+$) and is suitable as a material for use in electrochemical devices.

Example 6: Thermal Stress Resistance

Polymer 1 was dissolved in a 1 M $LiPF_6$ electrolytic solution (solvent: propylene carbonate) at a concentration of 6% by weight to prepare a polymer solution.

The initial viscosity $\eta_0$ of the polymer solution was measured at 25° C. with a B-type viscometer. After that, the polymer solution was allowed to stand in a constant temperature bath of 60° C. for 100 hours. The viscosity $\eta_1$ was measured at 25° C. again. From $\eta_0$ and $\eta_1$, the viscosity retention ratio (($\eta_1/\eta_0$)×100(%)) was determined. The viscosity retention ratio was 100%.

Comparative Example 4

A viscosity retention ratio of the polymer solution was determined by the same manner as that of Reference Example 2 except that Comparative Polymer C4 was used instead of Polymer 1. The viscosity retention ratio was 30%.

It can be seen that thermal resistance of Comparative Polymer C4 in the electrolytic solution is lower than that of Polymer 1.

Example 7: Alkali Stress Resistance

NCA ($LiNi_{0.82}Co_{0.15}Al_{0.03}O_2$) as a positive electrode active material, acetylene black (AB) as an electroconductive auxiliary agent, and Polymer 2 were weighed at a weight ratio of positive electrode active material:AB:polymer 2 of 100:2:1.2. To them, an appropriate amount of N-methylpyrrolidone was further added. The mixture was stirred with a planetary mixer to prepare a slurry for a positive electrode of a lithium ion secondary battery. Immediately after the preparation, liquidity at 25° C. was checked. Flowing was confirmed. Subsequently, the slurry for a positive electrode was allowed to stand under an environment of 25° C. for 24 hours, and liquidity was checked again. Flowing was confirmed.

Comparative Example 5

Liquidity of a slurry for a positive electrode was checked by the same manner as that of Example 7 except that Comparative Polymer C5 was used instead of Polymer 2. Immediately after the preparation, liquidity at 25° C. was checked. Flowing was confirmed. When liquidity after preservation was checked, the slurry exhibited a gel state and did not exhibit flowing. Disappearance of such flowability is believed to be due to gelation that is caused by dehydrofluorination of PVDF due to high pH of NCA.

(Reference Example 2: Adhesion to substrate) Each of Polymer 3, Comparative Polymer C2, and Comparative Polymer C4 was dissolved in ion-exchanged water so that the concentration became 5% by weight. Thus, three types of polymer solutions were obtained. Each of the polymer solutions was applied onto each of an aluminum foil, a copper foil, and a stainless (SUS304) foil, followed by drying. Thus, nine types of coating films having a thickness of 50 micron were obtained. The coating films were each tried to be peeled from the foils by scraping the coating films with forceps.

For the coating films of Polymer 3, the coating films formed on all the foils were not peeled.

For the coating films of Comparative Polymer C2, the coating films formed on all the foils were detached at only portions that were scraped with forceps.

For the coating films of Comparative Polymer C4, the coating films formed on all the foils were detached in a film shape.

Reference Example 3: Use in Combination with Non-Ionic Conductive Polymer

Polymer 1 and Comparative Polymer C5 were dissolved in N-methyl-2-pyrrolidone at various ratios. Thus, five types of polymer solutions 1 to 5 were obtained. The total concentration of Polymer 1 and Comparative Polymer C5 in each of the polymer solutions 1 to 5 was set to 8% by weight. The weight ratio of Polymer 1 relative to Comparative Polymer C5 in each of the polymer solutions 1 to 5 was set to 0:100 (polymer solution 1), 10:90 (polymer solution 2), 20:80 (polymer solution 3), and 50:50 (polymer solution 4).

Each of the polymer solutions was cast on a polytetrafluoroethylene tray and dried at 160° C. to distill N-methyl-2-pyrrolidone off. Thus, films each having a thickness of 100 μm were obtained. The obtained films were immersed in 1

M LiPF$_6$ (solvent: EC/EMC=3/7, weight ratio) for 1 hour to cause the electrolytic solution to infiltrate through the films. Subsequently, the films were taken out, the excess electrolytic solution was wiped off, and the films were each disposed between two SUS plates. The ionic conductive resistance was measured by ΔC impedance method. The results were a value equal to or less than a measurement lower limit (polymer solution 1), 22Ω (polymer solution 2), 10Ω (polymer solution 3), 6Ω (polymer solution 4), and (polymer solution 5). When a film does not contain a polyoxazoline polymer, ionic conductivity is not exhibited. However, when the ratio of polyoxazoline polymer occupying in the entire film is 10% by weight or more, ionic conductivity is observed. It can be seen that when a polyoxazoline polymer is added to a polymer having no ionic conductivity, ionic conducting pathway can be formed.

Reference Example 4: Measurement of Viscosity of Solution

The polymers 1 to 3 and Comparative Polymer C2 were each dissolved in ion-exchanged water at room temperature to obtain a 5% aqueous solution. The viscosities of the polymers 1 to 3 and Comparative Polymer C2 were measured at a rotation number of 6 rpm and 25° C. with a B-type viscometer, and were found to be 17, 6.6, 2.6, and 1.3 cP, respectively.

Each of the polymer solutions was cast on a polytetrafluoroethylene tray and dried at 160° C. to distill N-methyl-2-pyrrolidone off. Thus, films each having a thickness of 100 μm were obtained. The obtained films were immersed in 1 M LiPF$_6$ (solvent: EC/EMC=3/7, weight ratio) for 1 hour to cause the electrolytic solution to infiltrate through the films. Subsequently, the films were taken out, the excess electrolytic solution was wiped off, and the films were each disposed between two SUS plates. The ionic conductive resistance was measured by ΔC impedance method. The results were a value equal to or less than a measurement lower limit (polymer solution 1), 22Ω (polymer solution 2), 10Ω (polymer solution 3), 6Ω (polymer solution 4), and (polymer solution 5).

When a film does not contain a polyoxazoline polymer, ionic conductivity is not exhibited. However, when the ratio of polyoxazoline polymer occupying in the entire film is 10% by weight or more, ionic conductivity is observed. It can be seen that when a polyoxazoline polymer is added to a polymer having no ionic conductivity, ionic conducting pathway can be formed.

Example 8: Production of Coating Liquid for Insulating Layer and Production of Insulating Layer 100 parts of alumina particles having a volume-average particle diameter of 0.6 μm, a 1% by weight aqueous solution of Polymer 1 in an amount equivalent to a solid content of Polymer 1 of 1 part, and a 1% by weight aqueous solution of Comparative Polymer C1 in an amount equivalent to a solid content of Comparative Polymer C1 of 2 parts were added. The mixture was dispersed with a bead mill, and ion-exchanged water was mixed so that the solid content concentration became 25%. Thus, a slurry for a porous membrane was prepared. This slurry was applied onto a polyolefin separator (CELGARD 2325 available from Polypore International, Inc.), followed by drying. Thus, a composite separator with an alumina layer having a thickness of 2 μm was obtained.

This composite separator and the positive electrode obtained in Example 5-1 were bonded to each other and rubbed with each other under a load of 1 g/cm$^2$. As a result, detachment of alumina from the separator and transfer thereof to the positive electrode were not observed, and a composite separator that causes little degree of powder falling was obtained.

Comparative Example 6

A composite separator was obtained by the same manner as that of Example 8 except that only Comparative Polymer C1 was used without adding the aqueous solution of Polymer 1.

This composite separator and the positive electrode obtained in Comparative Example 3 were bonded to each other and rubbed with each other under a load of 1 g/cm$^2$. As a result, a behavior in which alumina was partially detached from the separator and particles thereof was transferred to the positive electrode was observed. It was thus found that the composite separator was one in which powder falling occurred more frequently than Example 8.

Example 9: Production and Application of Undercoat Liquid 30 g of Polymer 6 was added to 1,000 g of ion-exchanged water, and completely dissolved with stirring at 25° C. for 2 hours. This solution was placed into a bead mill equipped with a cooling jacket, and zirconia balls having a diameter of 0.5 mm were put at a filling rate of 80%. Then, 25 g of acetylene black (HS-100 manufactured by Denka Company Limited) was added as electroconductive particles, and the mixture was carefully dispersed so that the temperature of the mixture did not exceed 40° C. Thus, an electroconductive undercoat liquid was obtained. The undercoat liquid was applied onto an aluminum foil having a thickness of 20 μm and having a surface etched (Rz=4.6 μm) as a current collector with a micro gravure coater (μ coater manufactured by YASUI SEIKI CO., LTD.), and dried to obtain an undercoat layer having a dried thickness of 1 μm. The obtained undercoat layer was tried to be peeled from the foil by scraping with forceps. However, it was confirmed that the undercoat layer was well attached without peeling.

Example 10

2 parts of Polymer 1, 8 parts of an electrolytic solution (solvent: EC/PC=5/5 (weight ratio)), electrolyte: 1 M LiPF$_6$), 100 parts of LiCoO$_2$ (CELLSEED C available from Nippon Chemical Industrial Co., LTD., granular active material; number-average particle diameter: 20 μm) as a positive electrode active material, and 4 parts of acetylene black (HS-100 manufactured by Denka Company Limited) as an electroconductive material were weighed in a mortar and well kneaded to obtain a clay kneaded product. This clay kneaded product was extended on an etched aluminum foil (Rz=6 μm) and bonded to thereby produce a positive electrode of a lithium ion secondary battery having a basis weight of 21 mg.

Subsequently, 2 parts of Polymer 1, 8 parts of an electrolytic solution (solvent: EC/PC=5/5 (weight ratio)), electrolyte: 1 M LiPF$_6$), and 40 parts of graphite (MCMB available from MTI Corporation; number-average particle diameter: 18 μm) as a negative electrode active material were weighed in a mortar, and well kneaded to obtain a clay kneaded product. This clay kneaded product was extended on an etched copper foil (Rz=5 μm) and bonded to produce a negative electrode of a lithium ion secondary battery having a basis weight of 11 mg.

The positive electrode was cut into 10 cm×10 cm, and the negative electrode was cut into 10.2 cm×10.2 cm. A polypropylene separator of a single layer that was impregnated with an electrolytic solution (solvent: EC/PC=5/5 (weight ratio)) obtained by dissolving Polymer 1 at a concentration of 20% and cut into 10.4 cm×10.4 cm, was disposed between the positive electrode and the negative electrode to form a lithium ion battery. This layered body exhibited tackiness without particular fixation due to polyoxazoline contained in the electrolytic solution, and thus an attached and bonded state was maintained.

This layered body was housed in an aluminum-laminated outer container, and an opening was heat-sealed to produce a lithium ion secondary battery. In this process, additional injection of the electrolytic solution was not performed.

This lithium ion secondary battery was capable of stably effecting charging and discharging at a charging-discharging rate of 1.0 C between 3.0 to 4.20 V under an environment of 25° C.

Example 11

A 10% aqueous solution of Polymer 1 was prepared, and sprayed on a polypropylene separator that had been cut into 5 cm square. The amount of the polymer attached to the separator was 0.1 mg/cm². In an undried state, the separator on which the aqueous solution was sprayed was sticky. This separator was bonded to the positive electrode produced in Example 5-1 that was cut into 4.8 cm square. As a result, the separator and the positive electrode were integrated and were unlikely to be shifted from each other. In a case of a separator onto which the polymer is not applied, an electrode and the separator are not integrated, and thus there may arise a problem in which the electrode and the separator are shifted from each other during production of a battery. Since polyoxazoline has ionic permeability, movement of ions is not blocked even when the polymer is applied onto the separator. However, for example, when the same operation is performed using Comparative Polymer C1, holes of a separator are sealed with a membrane through which ions do not permeate, and thus the output of a battery may be decreased.

Reference Example 5

Each of Polymer 1, Polymer 2, Comparative Polymer C6, and Comparative Polymer C7 was dissolved in propylene carbonate to thereby obtain a solution having a concentration of 5% by weight. The viscosity of each of the solutions was measured at 25° C.

Subsequently, a Li salt (LiTFSI: lithium bistrifluorosulfonyl imide) was dissolved in each of the solutions to prepare electrolytic solution-like solutions. The amount of Li salt added was 0.5 mol/kg as an amount relative to the weight of propylene carbonate. The viscosity of each of the electrolytic solution-like solutions was measured at 25° C., and the rate of increase in viscosity before and after the addition of the Li salt was determined. The results are shown in Table 1.

All the solutions of the polymers exhibit very low viscosity for the concentrations. For all the solutions in which the Li salt was subsequently added, an increase in viscosity was confirmed. When the weight-average molecular weight was more than 50,000, a large increase in viscosity due to addition of the Li salt was confirmed. This is believed to suggest that an interaction between the polymer molecules particularly strongly acts when the weight-average molecular weight is more than 50,000, and believed that this phenomenon leads to an increase in stress resistance of an electrochemical device and an electrode thereof.

TABLE 1

|  | Polymer | | | |
| --- | --- | --- | --- | --- |
|  | C7 | C6 | 2 | 1 |
| Mw | 35000 | 50000 | 200000 | 500000 |
| Solution viscosity (cP) | 6.87 | 8.54 | 19.5 | 40.5 |
| Li salt-containing solution viscosity (cP) | 33.1 | 54.1 | 190 | 562 |
| Viscosity increase rate (times) | 4.8 | 6.3 | 9.7 | 13.9 |

The invention claimed is:

1. An electrochemical device, which is a non-aqueous electrochemical device, comprising a polymer (P) enclosed in an inside of the electrochemical device, wherein
the polymer (P) is a polymer having a molecular structure containing a unit (P) represented by the following formula (P), the polymer (P) having a weight-average molecular weight of greater than 50,000:

(Chemical formula 1)

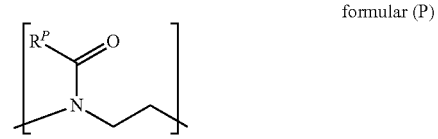

formular (P)

in the formula (P), $R^P$ is a group of 1 to 20 carbon atoms.

2. The electrochemical device according to claim 1, wherein a ratio of the unit (P) relative to the polymer (P) molecule is 50% by weight or more.

3. The electrochemical device according to claim 1, wherein the polymer (P) contains, as the unit (P), a unit in which the $R^P$ is a methyl group or an ethyl group.

4. The electrochemical device according to claim 1, wherein the polymer (P) contains, as the unit (P), a unit in which the $R^P$ is a group of 3 to 20 carbon atoms.

5. The electrochemical device according to claim 1, wherein the polymer (P) contains, as the unit (P), a unit in which the $R^P$ is a group containing a cross-linked structure.

6. The electrochemical device according to claim 1, wherein the polymer (P) contains, as the unit (P), a unit in which the $R^P$ is a fluorine-containing group.

7. The electrochemical device according to claim 1, further comprising an electrolytic solution, wherein
an amount of the polymer (P) relative to 100 parts by weight of the electrolytic solution is 5 parts by weight or more.

8. An electrode for an electrochemical device, which is a non-aqueous electrochemical device, the electrode comprising a granular active material and a polymer (P), wherein
the polymer (P) is a polymer having a molecular structure containing a unit (P) represented by the following formula (P), the polymer (P) having a weight-average molecular weight of greater than 50,000:

(Chemical formula 2)

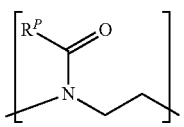

formular (P)

in the formula (P), $R^P$ is a group of 1 to 20 carbon atoms.

9. The electrode for an electrochemical device according to claim 8, wherein a ratio of the unit (P) relative to the polymer (P) molecule is 50% by weight or more.

10. The electrode for an electrochemical device according to claim 8, wherein the polymer (P) contains, as the unit (P), a unit in which the $R^P$ is a methyl group or an ethyl group.

11. The electrode for an electrochemical device according to claim 8, wherein the polymer (P) contains, as the unit (P), a unit in which the $R^P$ is a group of 3 to 20 carbon atoms.

12. The electrode for an electrochemical device according to claim 8, wherein an amount of the polymer (P) relative to 100 parts by weight of the granular active material is more than 1 part by weight.

13. The electrode for an electrochemical device according to claim 8, comprising a mixture layer containing the granular active material and the polymer (P) and a current collector layer.

14. The electrode for an electrochemical device according to claim 13, wherein the current collector layer is a metal layer.

15. The electrode for an electrochemical device according to claim 13, wherein the current collector layer has unevenness, with Ry being 500 nm or more, on a surface thereof that is in contact with the mixture layer.

16. A coating liquid for an electrochemical device comprising a polymer (P), wherein
the polymer (P) is a polymer having a molecular structure containing a unit (P) represented by the following formula (P), the polymer (P) having a weight-average molecular weight of greater than 50,000:

(Chemical formula 3)

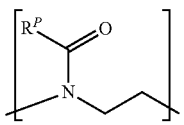

formular (P)

in the formula (P), $R^P$ is a group of 1 to 20 carbon atoms.

17. The coating liquid for an electrochemical device according to claim 16, wherein a ratio of the unit (P) relative to the polymer (P) molecule is 50% by weight or more.

18. The coating liquid for an electrochemical device according to claim 16, wherein the polymer (P) contains, as the unit (P), a unit in which the $R^P$ is a methyl group or an ethyl group.

19. The coating liquid for an electrochemical device according to claim 16, wherein the polymer (P) contains, as the unit (P), a unit in which the $R^P$ is a group of 3 to 20 carbon atoms.

20. The coating liquid for an electrochemical device according to claim 16, wherein the polymer (P) contains, as the unit (P), a unit in which the $R^P$ is a group containing a cross-linkable partial structure.

21. The coating liquid for an electrochemical device according to claim 16, having a slurry property.

22. An insulating layer for an electrochemical device, comprising a layer obtained by curing the coating liquid according to claim 16.

23. The insulating layer according to claim 22, comprising a cross-linked product of the polymer (P) formed by curing.

24. An electrode for an electrochemical device, comprising a layer obtained by curing the coating liquid according to claim 16.

25. The electrode according to claim 24, comprising a cross-linked product of the polymer (P) formed by curing.

26. An undercoat layer for an electrochemical device, comprising a layer obtained by curing the coating liquid according to claim 16.

27. The undercoat layer according to claim 26, comprising a cross-linked product of the polymer (P) formed by curing.

28. An electrolytic solution for an electrochemical device, comprising a polymer (P), wherein
the polymer (P) is a polymer having a molecular structure containing a unit (P) represented by the following formula (P), the polymer (P) having a weight-average molecular weight of greater than 50,000:

(Chemical formula 4)

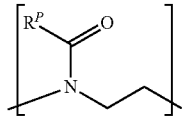

formular (P)

in the formula (P), $R^P$ is a group of 1 to 20 carbon atoms.

29. The electrolytic solution for an electrochemical device according to claim 28, wherein a ratio of the unit (P) relative to the polymer (P) molecule is 50% by weight or more.

30. The electrolytic solution for an electrochemical device according to claim 28, wherein the polymer (P) contains, as the unit (P), a unit in which the $R^P$ is a methyl group or an ethyl group.

31. The electrolytic solution for an electrochemical device according to claim 28, wherein the polymer (P) contains, as the unit (P), a unit in which the $R^P$ is a group of 3 to 20 carbon atoms.

32. The electrolytic solution for an electrochemical device according to claim 28, wherein the polymer (P) contains, as the unit (P), a unit in which the $R^P$ is a group containing a cross-linkable partial structure.

* * * * *